United States Patent Office 2,716,961
Patented Sept. 6, 1955

2,716,961

WATER MARKING DEVICE

Theodore B. Manheim, Philadelphia, and Joseph L. Castelli, Ardmore, Pa.

No Drawing. Application December 29, 1952,
Serial No. 328,536

3 Claims. (Cl. 116—124)

(Granted under Title 35, U. S. Code (1952), sec. 266)

The invention described herein may be manufactured and used by or for the Government of the United States of America for governmental purposes without the payment of any royalties thereon or therefor.

This invention relates to a device for coloring water and particularly relates to a device for coloring water to act as a marker in air-sea survival usage.

The method of coloring water to act as a marker which is now generally in use consists of a cotton container or bag in which a dyestuff is placed, the bag being porous enough to allow water to seep through and carry the coloring matter out with it in solution. The disadvantages of this method are many, however. For one thing, there is always the possibility of ripping the container and losing the dye contents. Another disadvantage is that after a sufficient amount of water absorption has taken place, the bag becomes heavier than the water and sinks. Furthermore, while not in use, moisture is absorbed by the bag from the air, thereby causing the dyestuff to cake. Such caked dyestuff has poor solubility which results in an erratic release of color. Finally, there is no control at all over the rate of solubility of the dye in the water.

It is, therefore, one object of this invention to provide a device for releasing a dye in water at a controlled rate by controlling the rate of solubility of the dye in water.

Another object of this invention is to provide a dye release means which will not sink due to water absorption during use.

Another object of this invention is to provide a dye release means which will not absorb moisture during storage or when not in use and where there will, therefore, be no tendency for the dyestuff to cake.

Another object of this invention is to provide a dye release means which cannot be damaged by ripping or tearing.

Other objects and many of the attendant advantages of this invention will be readily appreciated as the same becomes better understood by reference to the following detailed description and claims.

The invention essentially consists of a blown or porous resin foam having a high degree of cell interconnection internally and which is impregnated with a dye soluble in water. The blown or porous resin foam constitutes a carrier for the dye and is adapted to float on water. It may be cut into blocks of any convenient size or shape for the intended purposes.

The resinous foam of this invention is to be distinguished from the cellulosic type of foam, such as used in making artificial sponges and the like. The cellulosic type of foam is highly porous and readily absorbs moisture or water. The resinous foam, on the other hand, has a high degree of cell interconnection in contrast to the cellulosic type and takes in water only through the process of capillary action and practically not at all through absorption. A desirable percentage of cell interconnection is about 90 percent. Preferably, most of the cells should be quite small in size.

A desirable type of resinous foam for forming the foam block consists of the following ingredients in the proportions named:

200–300 parts of a liquid phenol-formaldehyde
1–8 parts magnesium powder
30–45 parts HCl in about a 50 percent concentration Aluminum or zinc may be substituted for the magnesium although the magnesium is preferred because of its greater reaction rate.

To produce the foam product, air is beaten into the resin. The magnesium or other metal powder is then added slowly to insure complete dispersion. The HCl is thereafter added and beaten into the resin mixture by means of a high speed agitator. The beating time may be from 10 to 20 seconds. The resulting foaming action is fairly rapid and accompanied by a high exothermal heat evolution. The foam hardens almost immediately after completion of the reaction. The resulting sizes of the cells produced in this manner are generally small and consistent.

The coloring material or dye may be introduced into the resinous foam by immersing the latter in the selected dye. The dye lines the walls of the cells of the foam block. To obtain a higher concentration of dyestuff in the foam block, the block may be immersed in the dye and then dried several times. Preferably, the block may be impregnated with a combination of a dyestuff and a water soluble resin. In this case, the resin carrier acts as an additional retardent to the solubility of the dye when the block is immersed in water. By varying the type and amount of resin carrier, as well as by controlling the cell size of the block, the solubility of the dye can be accurately controlled.

The size of the cells in the foam block may be varied by varying the amount of the metal content of the mixture. By increasing the magnesium content, the reaction is more violent liberating a greater proportion of gases. This results in the formation of larger cells. By providing a series of foam bodies graduating in cell size, it is possible to accurately control the rate of solubility of the dye or other impregnating material. The larger the cells, the faster the rate of solubility.

An alternate method of impregnating the resinous foam block with the dyestuff is to drill out a block of resinous foam and substantially fill the hole with the dyestuff. The filled hole may then be sealed with a plug of the same or similar material as the block. Either one or a plurality of such holes may be used.

In the use of the dye impregnated resinous foam for survival purposes, the foam block is tossed on the water. The water penetrates the interconnected cells by capillary action and at a substantially constant rate. After a sufficient amount of water has been colored, the foam block may be removed from the water, allowed to dry, and then reused at a later time. The dye is selected for the purpose intended, such as for signalling rescue aircraft, scaring away predatory fish, or for attracting fish to be used as food.

Although the invention has been described as being applicable specifically to use as a carrier for dyestuff in air-sea survival, it is by no means limited to such purposes. The resinous foam composition may be used in a variety of chemical processes where it is important to control the rate of the chemical reaction by controlling the rate of solubility of an activating ingredient introduced into the process by means of the resinous foam product. It may also be used as an insulating means or to form bearings for engines, machine parts and the like wherein the resinous foam may be impregnated with a lubricant.

Obviously many modifications and variations of the present invention are possible in the light of the above teachings. It is, therefore, to be understood that within the scope of the appended claims, the invention may be practiced otherwise than as specifically described.

What is claimed as the invention is:

1. A marker for air-sea survival usage comprising a rigid, porous resinous foam body having a high degree of cell interconnection, said body being impregnated with a water-soluble dye, said dye being adapted to readily go into solution and flow out of said body when said body is immersed in water.

2. A marker for air-sea survival usage comprising a rigid, porous, cellular, resinous foam body impregnated with a water-soluble dye, said dye lining the walls of the cells of said body, and being adapted to readily go into solution and flow out of said body when said body is immersed in water.

3. A marker for air-sea survival usage comprising a rigid, porous, cellular, resin foam body having at least one drilled hole therein, said hole being filled with a water-soluble dyestuff, and a plug, of the same material as said body, sealing the opening of said hole.

References Cited in the file of this patent

UNITED STATES PATENTS

| | | |
|---|---|---|
| 2,022,710 | Esselen | Dec. 3, 1935 |
| 2,076,295 | Curs et al. | Apr. 6, 1937 |
| 2,334,000 | Hamm | Nov. 9, 1943 |
| 2,398,703 | Gardner et al. | Apr. 16, 1946 |
| 2,432,971 | Ruthman et al. | Dec. 16, 1947 |
| 2,582,228 | Brinkema | Jan. 15, 1952 |
| 2,629,698 | Sterling | Feb. 24, 1953 |

OTHER REFERENCES

Textbook of Physical Chemistry, Glasstone, second edition, April 1946, page 1194.

Plastics (Chicago), vol. 9, Issue 2, pages 8 and 9, November 1949.